(12) United States Patent
Xiao

(10) Patent No.: US 10,133,117 B2
(45) Date of Patent: Nov. 20, 2018

(54) DISPLAY DEVICE AND MANUFACTURING METHOD THEREOF

(71) Applicant: Yulong Computer Telecommunication Scientific (Shenzhen) Co., Ltd., Shenzhen, Guangdong (CN)

(72) Inventor: Jian Xiao, Guangdong (CN)

(73) Assignee: Yulong Computer Telecommunication Scientific (Shenzhen) Co., Ltd., Shenzhen, Guangdong (CN)

(*) Notice: Subject to any disclaimer, the term of this patent is extended or adjusted under 35 U.S.C. 154(b) by 32 days.

(21) Appl. No.: 15/307,589

(22) PCT Filed: Apr. 29, 2015

(86) PCT No.: PCT/CN2015/077860
§ 371 (c)(1),
(2) Date: Oct. 28, 2016

(87) PCT Pub. No.: WO2015/165410
PCT Pub. Date: Nov. 5, 2015

(65) Prior Publication Data
US 2017/0160586 A1    Jun. 8, 2017

(30) Foreign Application Priority Data

Apr. 29, 2014 (CN) .......................... 2014 1 0176926

(51) Int. Cl.
*G02F 1/1335* (2006.01)
*G06F 1/16* (2006.01)
(Continued)

(52) U.S. Cl.
CPC .. *G02F 1/133526* (2013.01); *G02F 1/133308* (2013.01); *G06F 1/16* (2013.01);
(Continued)

(58) Field of Classification Search
CPC .................. G02F 1/133526; G02F 1/133308
(Continued)

(56) References Cited

U.S. PATENT DOCUMENTS

2004/0051944 A1    3/2004  Stark
2006/0077544 A1*   4/2006  Stark ................... G02F 1/13336
                                                            359/448
(Continued)

FOREIGN PATENT DOCUMENTS

CN        101868814 A      10/2010
CN        101989141 A       3/2011
(Continued)

*Primary Examiner* — Audrey Y Chang
(74) *Attorney, Agent, or Firm* — Young Basile Hanlon & MacFarlane, P.C.

(57) ABSTRACT

A display device used in the technical field of communications comprises a housing, a display panel and a light-transmitting cover plate; the display panel is disposed in the housing to form a display area constituted by the display panel and a frame area surrounding the display panel; the light-transmitting cover plate covers the housing to form the outer surface of the display device; the light-transmitting cover plate has a first light-transmitting part and a second light-transmitting part; the first light-transmitting part corresponds to the display area, and the second light-transmitting part corresponds to the frame area; the light emitted by the display panel transmits outward through the first light-transmitting part and the second light-transmitting part; the outer surface of the second light-transmitting part is provided with an optical.

11 Claims, 5 Drawing Sheets

(51) Int. Cl.
    *G09F 9/00*           (2006.01)
    *G02F 1/1333*       (2006.01)
    *G02B 27/09*        (2006.01)
    *G02B 27/12*        (2006.01)

(52) U.S. Cl.
    CPC .............. *G09F 9/00* (2013.01); *G02B 27/095* (2013.01); *G02B 27/12* (2013.01); *G02F 2001/133331* (2013.01); *G02F 2001/133388* (2013.01); *G02F 2203/24* (2013.01)

(58) Field of Classification Search
    USPC ....................... 349/58, 64; 345/102; 359/448; 361/679.01
    See application file for complete search history.

(56)                 References Cited

U.S. PATENT DOCUMENTS

2010/0123849 A1*   5/2010   Matsushima ..... G02F 1/133308
                                                   349/58
2011/0025594 A1*   2/2011   Watanabe ........... G02F 1/13336
                                                   345/102
2012/0069273 A1*   3/2012   Watanabe ............ G02B 5/0215
                                                     349/64

FOREIGN PATENT DOCUMENTS

| CN | 102067197 A | 5/2011 |
|----|-------------|--------|
| CN | 104484016 A | 4/2015 |
| KR | 20090058984 A | 6/2009 |

\* cited by examiner

```
┌─────────────────────────────────────────┐
│  PROVIDING A DISPLAY PANEL, A HOUSING AND A     │
│  LIGHT-TRANSMITTING COVER PLATE, AND DISPOSING  │
│  THE DISPLAY PANEL IN THE HOUSING TO FORM A     │
│  DISPLAY AREA CONSTITUTED BY THE DISPLAY PANEL  │──S101
│  AND A FRAME AREA SURROUNDING THE DISPLAY       │
│  AREA, WHEREIN THE LIGHT-TRANSMITTING COVER     │
│  PLATE HAS A FIRST LIGHT-TRANSMITTING PART AND A│
│  SECOND LIGHT-TRANSMITTING PART                 │
└─────────────────────────────────────────┘
                    │
                    ▼
┌─────────────────────────────────────────┐
│  DISPOSING THE LIGHT-TRANSMITTING COVER PLATE   │
│  TO COVER THE HOUSING TO FORM THE OUTER         │
│  SURFACE OF THE DISPLAY DEVICE, AND ENABLING THE│──S102
│  FIRST LIGHT-TRANSMITTING PART TO CORRESPOND TO │
│  THE DISPLAY AREA AND ENABLING THE SECOND       │
│  LIGHT-TRANSMITTING PART TO CORRESPOND TO THE   │
│  FRAME AREA                                     │
└─────────────────────────────────────────┘
                    │
                    ▼
┌─────────────────────────────────────────┐
│  PROVIDING THE OUTER SURFACE OF THE SECOND      │
│  LIGHT TRANSMITTING PART WITH AN OPTICAL PART   │
│  USED TO CHANGE THE EXIT DIRECTION OF THE LIGHT │
│  EMITTED BY THE DISPLAY PANEL THROUGH THE       │
│  SECOND LIGHT-TRANSMITTING PART SO AS TO ENABLE │──S103
│  THE DIRECTION OF THE LIGHT TRANSMITTED FROM    │
│  THE SECOND LIGHT-TRANSMITTING PART TO BE THE   │
│  SAME AS THE DIRECTION OF THE LIGHT TRANSMITTED │
│  FROM THE FIRST LIGHT-TRANSMITTING PART         │
└─────────────────────────────────────────┘
```

FIG. 6

DISPLAY DEVICE AND MANUFACTURING METHOD THEREOF

CROSS-REFERENCE TO RELATED APPLICATION(S)

The present application claims priority to Chinese Patent Application No. 201410176926.6, filed with the Chinese Patent Office on Apr. 29, 2014 and entitled "DISPLAY DEVICE AND MANUFACTURING METHOD THEREOF", the content of which is hereby incorporated by reference in its entirety.

TECHNICAL FIELD

The present disclosure relates to the technical field of communications, and specifically relates to a display device and a manufacturing method thereof.

BACKGROUND

As shown in FIG. 1, a display device 2 comprises a display panel 21, a housing 22, a light-transmitting cover plate 23. The housing 22 surrounds the display panel 21 and the light-transmitting cover plate 23. The total area of the display device 2 includes a display area 24, a frame area 25 and a housing thickness area 26. The frame area 25 is for arranging wires for the display panel 21. The non-display area of the display device 2 is the total of the frame area 25 and the housing thickness area 26. When images are displayed on the display panel 21, viewers may see a black border formed by the frame area 25, thereby affecting the viewers' experience.

SUMMARY

The present disclosure is addressed to the problems in prior art, and has a purpose of providing a display device and a manufacturing method thereof. According to the present disclosure, an optical part refracts the light transmitted into the second light-transmitting part to transmit toward viewers such that viewers may not see a black border in the frame area, so as to solve the problem that viewers see the black border formed in the frame area when the display device is displaying.

The technical solution provided by the present disclosure is a display device comprising a housing, a light-transmitting cover plate and a display panel disposed in the housing to form a display area constituted by the display panel and a frame area surrounding the display panel, wherein the light-transmitting cover plate covers the housing to form the outer surface of the display device; the light-transmitting cover plate has a first light-transmitting part corresponding to the display area and a second light-transmitting part corresponding to the frame area; the light emitted by the display panel transmits outward through the first light-transmitting part and the second light-transmitting part; the outer surface of the second light-transmitting part is provided with an optical part used to change the exit direction of the light emitted by the display panel through the second light-transmitting part so as to enable the direction of the light transmitted from the second light-transmitting part to be the same as the direction of the light transmitted from the first light-transmitting part.

Furthermore, the second light-transmitting part has an incidence surface and an exit surface; the incidence surface of the second light-transmitting part and the exit surface of the second light-transmitting part are horizontal surfaces; the exit surface of the second light-transmitting part is provided with an optical film for forming the optical part; the refractive index of the optical film is greater than that of the second light-transmitting part.

Furthermore, the second light-transmitting part has an incidence surface and an exit surface; the incidence surface of the second light-transmitting part is a horizontal surface while the exit surface of the second light-transmitting part is an inclined surface; the exit surface of the second light-transmitting part is provided with an optical film for forming the optical part; the refractive index of the optical film is smaller than that of the second light-transmitting part.

Furthermore, a transition surface is disposed between the exit surface of the second light-transmitting part and the exit surface of the first light-transmitting part, and the transition surface is arc-shaped.

Furthermore, the light-transmitting cover plate is bonded to the housing, and the light-transmitting cover plate is bonded to the display panel such that the display panel is disposed in the housing.

The present disclosure further provides a method for manufacturing a display device, comprising:

providing a display panel, a housing and a light-transmitting cover plate, and disposing the display panel in the housing to form a display area constituted by the display panel and a frame area surrounding the display area, wherein the light-transmitting cover plate has a first light-transmitting part and a second light-transmitting part;

disposing the light-transmitting cover plate to cover the housing to form the outer surface of the display device, and enabling the first light-transmitting part to correspond to the display area and enabling the second light-transmitting part to correspond to the frame area; and providing the outer surface of the second light transmitting part with an optical part used to change the exit direction of the light emitted by the display panel through the second light-transmitting part so as to enable the direction of the light transmitted from the second light-transmitting part to be the same as the direction of the light transmitted from the first light-transmitting part.

Furthermore, the method comprises configuring the incidence surface of the second light-transmitting part and the exit surface of the second light-transmitting part to be horizontal surfaces, and bonding an optical film to the exit surface of the second light-transmitting part to form the optical part, wherein the refractive index of the optical film is greater than that of the second light-transmitting part.

Furthermore, the method comprises configuring the incidence surface of the second light-transmitting part to be a horizontal surface while configuring the exit surface of the second light-transmitting part to be an inclined surface, and bonding an optical film to the exit surface of the second light-transmitting part to form the optical part, wherein the refractive index of the optical film is smaller than that of the second light-transmitting part.

Furthermore, the method comprises disposing a transition surface between the exit surface of the second light-transmitting part and the exit surface of the first light-transmitting part, wherein the transition surface is arc-shaped.

Furthermore, the method comprises bonding the light-transmitting cover plate to the housing, and bonding the display panel to the light-transmitting cover plate such that the display panel is secured in the housing.

The present disclosure further provides a terminal comprising a display device which comprises a housing, a light-transmitting cover plate and a display panel disposed in the housing to form a display area constituted by the display panel and a frame area surrounding the display panel, wherein the light-transmitting cover plate covers the housing to form the outer surface of the display device; the light-transmitting cover plate has a first light-transmitting part corresponding to the display area and a second light-transmitting part corresponding to the frame area; the light emitted by the display panel transmits outward through the first light-transmitting part and the second light-transmitting part; the outer surface of the second light-transmitting part is provided with an optical part used to change the exit direction of the light emitted by the display panel through the second light-transmitting part so as to enable the direction of the light transmitted from the second light-transmitting part to be the same as the direction of the light transmitted from the first light-transmitting part.

Furthermore, the second light-transmitting part has an incidence surface and an exit surface; the incidence surface of the second light-transmitting part and the exit surface of the second light-transmitting part are horizontal surfaces; the exit surface of the second light-transmitting part is provided with an optical film to form the optical part; the refractive index of the optical film is greater than that of the second light-transmitting part.

Furthermore, the second light-transmitting part has an incidence surface and an exit surface; the incidence surface of the second light-transmitting part is a horizontal surface while the exit surface of the second light-transmitting part is an inclined surface; the exit surface of the second light-transmitting part is provided with an optical film to form the optical part; the refractive index of the optical film is smaller than that of the second light-transmitting part.

Furthermore, a transition surface is disposed between the exit surface of the second light-transmitting part and the exit surface of the first light-transmitting part, and the transition surface is arc-shaped.

Furthermore, the light-transmitting cover plate is bonded to the housing, and the light-transmitting cover plate is bonded to the display panel such that the display panel is disposed in the housing.

By the above mentioned technical solution, the display device and the manufacturing method thereof according to the present disclosure have beneficial effects: the light-transmitting cover plate has a first light-transmitting part corresponding to the display area and a second light-transmitting part corresponding to the frame area; the light emitted by the display panel transmits outward through the first light-transmitting part and the second light-transmitting part; the outer surface of the second light-transmitting part is provided with an optical part used to change the exit direction of the light transmitted through the second light-transmitting part so as to enable the direction of the light transmitted through the second light-transmitting part to be the same as the direction of the light transmitted through the first light-transmitting part, such that viewers may not see a black border in the frame area and borderless display is achieved on the display device.

BRIEF DESCRIPTION OF THE DRAWINGS

FIG. 6 is a flowchart of a method for manufacturing a display device according to an implementation of the present disclosure.

DETAILED DESCRIPTION

The present disclosure is further described in detail hereinafter with reference to the drawings and implementations, in order to more fully understand the purposes, features and advantages of the present disclosure. It should be noted that, the implementations described herein are merely for explaining the present disclosure and are not intended to limit the present disclosure.

Figure 1:
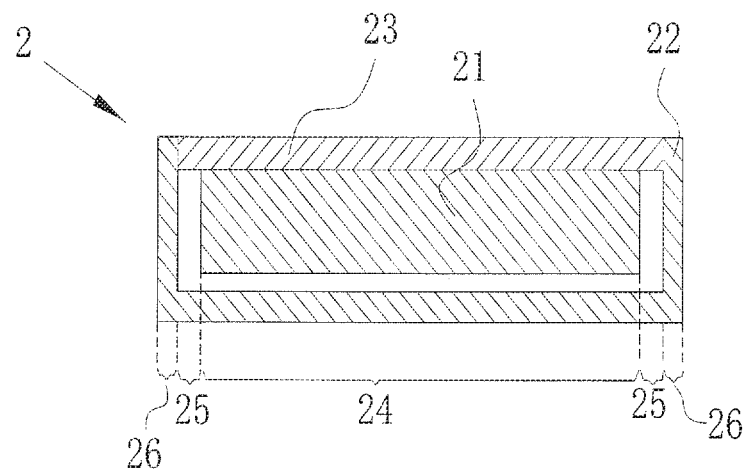
FIG. 1 is a cross-sectional view of a prior display device.
Figure 2:
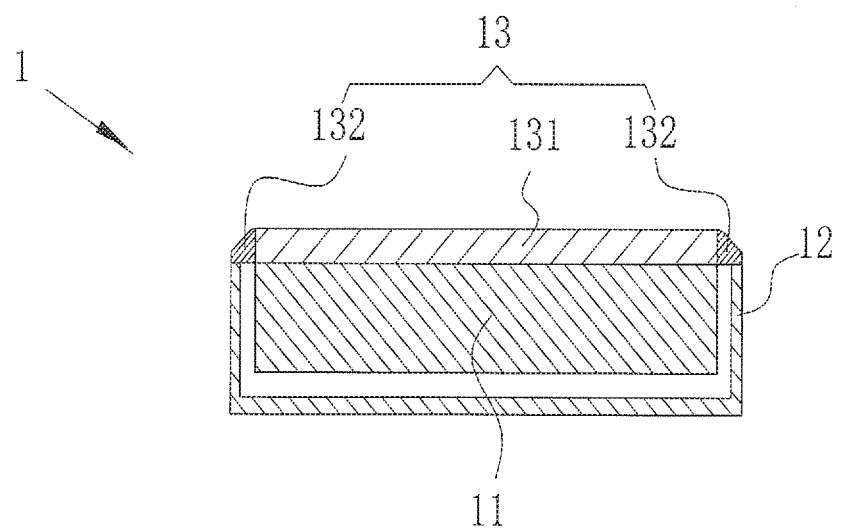
FIG. 2 is a cross-sectional view of a display device according to an implementation of the present disclosure.

As shown in FIG. 2, a display device 1 according to an implementation of the present disclosure comprises a display panel 11 and a housing 12.

Figure 3:
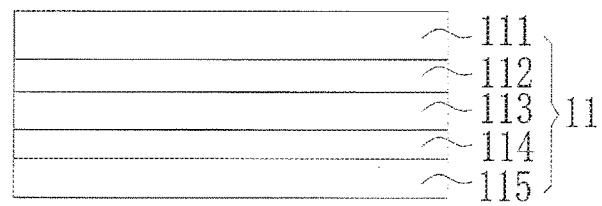
FIG. 3 is a schematic view of a display panel according to an implementation of the present disclosure.

As shown in FIG. 2 and FIG. 3, the display panel 11 is disposed in the housing 12. The display panel 11 comprises an upper polarizer 111, a color filter 112, a liquid crystal panel 113, a lower polarizer 114 and a backlight source 115.

In this implementation, the upper polarizer 111, the color filter 112, the liquid crystal panel 113, the lower polarizer 114 and the backlight source 115 are arranged in sequence from top to bottom. The light emitted by the backlight source 115 transmits outward through the lower polarizer 114, the liquid crystal panel 113, the color filter 112 and the polarizer 111 in sequence.

In this implementation, in order to increase the stability of the display device 1, the housing 12 is of metal material.

Between both sides of the display panel 11 and the housing 12 is a gap for receiving wires from the display panel 11.

Figure 4:
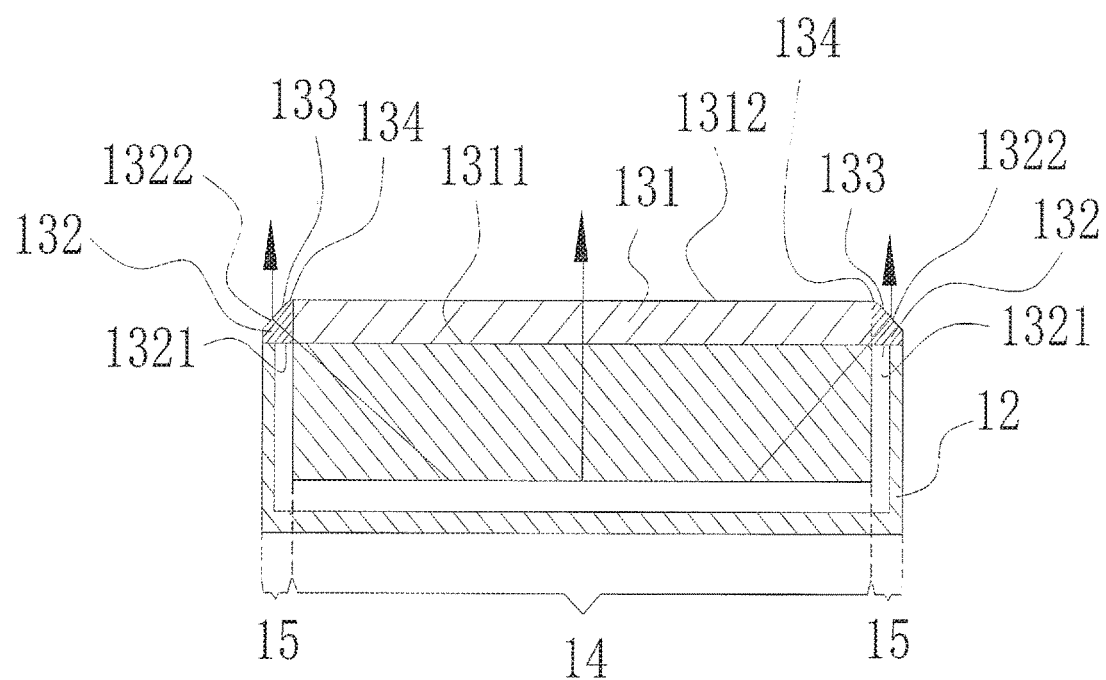
FIG. 4 is an optical path diagram in which an exit surface of a second light-transmitting part in a display device according to the present implementation is an inclined surface.

As shown in FIG. 4, the display device 1 comprises a display area 14 and a frame area 15.

The display panel 11 is disposed in the housing 12 to form a display area 14 constituted by the display panel 14 and a frame area 15 surrounding the display area 11.

The display area 14 is the luminous area of the display panel 11 in the housing 12, and the frame area 15 is the non-luminous area from the edge of the display area 14 to the exterior edge of the housing 12.

The display device 1 further comprises a light-transmitting cover plate 13 covering the housing 12 to form the outer surface of the display device 1.

In this implementation, the light-transmitting cover plate 13 is secured to the upper surface of the housing 12 by means of bonding.

The display panel 11 is bonded to the lower surface of the light-transmitting cover plate 13, such that the display panel 11 is disposed in the housing 12.

The light-transmitting cover plate 13 has a first light-transmitting part 131 corresponding to the display area 14 and a second light-transmitting part 132 corresponding to the frame area 15.

In this implementation, the first light-transmitting part 131 has an area equal to the display area 14, and the second light-transmitting part 132 has an area equal to the frame area 15.

The light emitted by the display panel 11 transmits into the first light-transmitting part 131, and transmits toward viewers through the first light-transmitting part 131.

In this implementation, the incidence surface 1311 of the first light-transmitting part 131 and the exit surface 1312 of the first light-transmitting part 131 are both horizontal surfaces.

The exit surface 1322 of the second light transmitting part 132 is provided with an optical part 134.

The light emitted by the display panel 11 transmits into the second light-transmitting part 132, and transmits outward through the exit surface 1322 of the second light-transmitting part 132. Since the exit surface 1322 of the second light-transmitting part 132 is provided with the optical part 134 used to change the exit direction of the light emitted by the display panel 11 through the second light-transmitting part 132 so as to enable the direction of the light transmitted from the second light-transmitting part 132 to be the same as the direction of the light transmitted from the first light-transmitting part 131.

In an implementation of the present disclosure, the optical part 134 enables the direction of the light transmitted from the second light-transmitting part 132 to be the same or substantially the same as the direction of the light transmitted from the first light-transmitting part 131.

Because of the refraction effect of the optical part 134, viewers, when viewing the frame area 15 through the optical part 134, may see images formed by the light transmitted from the display panel 11 through the frame area 15 instead of a black border in the frame area 15, and borderless display is achieved on the display device 1.

In the present disclosure, the incidence surface 1321 of the second light-transmitting part 132 and the exit surface 1322 of the second light-transmitting part 132 are mainly in the following two situations.

Figure 5:
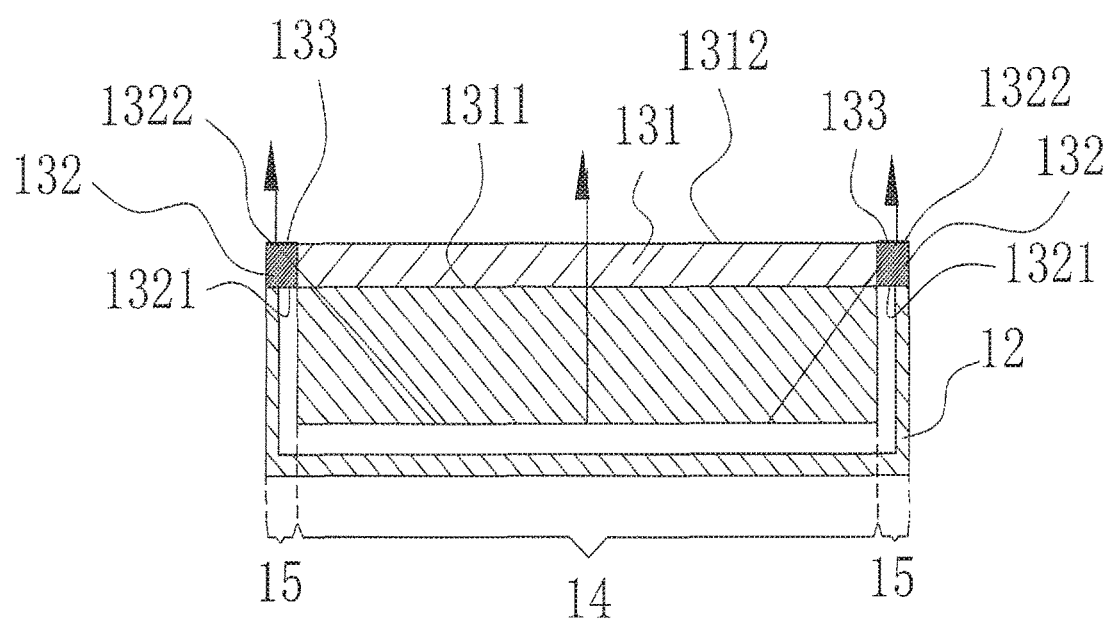
FIG. 5 is an optical path diagram in which an exit surface of a second light-transmitting part in a display device according to the present implementation is a horizontal surface.

In the first situation, as shown in FIG. 5, the incidence surface 1321 of the second light-transmitting part 132 and the exit surface 1322 of the second light-transmitting part 132 are horizontal surfaces, and the exit surface 1322 of the second light-transmitting part 132 is provided with an optical film for forming the optical part 134. The refractive index of the optical film is greater than that of the second light-transmitting part 132.

The light emitted by the display panel 11 transmits into the first light-transmitting part 131 and the second light-transmitting part 132. The light transmitted into the first light-transmitting part 131 is relatively concentrated, and transmits outward from the area in which the first light-transmitting part 131 is located. And, if the exit surface 1322 of the second light-transmitting part 132 is not provided with the optical part 134, the light transmitted into the second light-transmitting part 132 may transmit outward through the exit surface 1322 of the second light-transmitting part 132 and away from the area in which the second light-transmitting part 132 is located. Consequently, the center of the display device 1 is bright while the sides thereof are dark, thereby forming a black border in the frame area 15.

In the present disclosure, in order to solve the black border formed in the frame area 15, the exit surface 1322 of the second light-transmitting part 132 is provided with the optical film for forming the optical part 134, such that the direction of the light transmitted from the second light-transmitting part 132 is enabled to be the same as the direction of the light transmitted from the first light-transmitting part 131. The optical part 134 refracts the light transmitted through the second light-transmitting part 132 to be substantially parallel with the normal.

In accordance with the principle of the light refraction, when light transmits from optically thinner medium into optically denser medium, the light will be refracted close to the normal, and the incidence angle is greater than the exit angle. The optically denser medium and the optically thinner medium are relative media, and medium with a larger refractive index is referred to as optically denser medium while medium with a smaller refractive index is referred to as optically thinner medium. Thus, only if the refractive index of the optical film is greater than that of the second light-transmitting part 132, the light transmitted through the second light-transmitting part 132 may be refracted to be substantially parallel with the normal, such that the direction of the light transmitted from the second light-transmitting part 132 is enabled to be the same as the direction of the light transmitted from the first light-transmitting part 131.

Naturally, by processing the exit surface 1322 of the second light-transmitting part 132, the refractive index of the exit surface 1322 of the second light-transmitting part 132 may be increased, so as to enable the exit surface of the second light-transmitting part 132 to form the optical part 134 for enabling the refractive index of the exit surface 1322 of the second light-transmitting part 132 to be greater than that of the second light-transmitting part 132. At this moment, the optical part 134 formed by the exit surface 1322 of the second light-transmitting part 132 enables the direction of the light transmitted from the second light-transmitting part 132 to be the same as the direction of the light transmitted from the first light-transmitting part 131.

In the second situation, as shown in FIG. 4, the incidence surface 1321 of the second light-transmitting part 132 is a horizontal surface while the exit surface 1322 of the second light-transmitting part 132 is an inclined surface, and the exit surface 1322 of the second light-transmitting part 132 is provided with an optical film for forming the optical part 134. The refractive index of the optical film is smaller than that of the second light-transmitting part 132.

As shown in FIG. 4, in the situation where the exit surface 1322 of the second light-transmitting part 132 is an inclined surface, the incidence surface 1321 of the second light-transmitting part 132 and the exit surface 1322 of the second light-transmitting part 132 form an acute angle.

Specifically, the acute angle is 45°.

In order to enable the direction of the light transmitted from the second light-transmitting part 132 to be the same as the direction of the light transmitted from the first light-transmitting part 131, the optical part 134 refracts the light transmitted through the second light-transmitting part 132 to be away from the normal.

In accordance with the principle of the light refraction, when light transmits from optically denser medium into optically thinner medium, the light will be refracted away from the normal, and the incidence angle is smaller than the exit angle. The optically denser medium and the optically thinner medium are relative media, and medium with a larger refractive index is referred to as optically denser medium while and medium with a smaller refractive index is referred to as optically thinner medium. Thus, only if the refractive index of the optical film is smaller than that of the second light-transmitting part 132, the light transmitted through the second light-transmitting part 132 may be refracted to be away from the normal, such that the direction of the light transmitted from the second light-transmitting part 132 is enabled to be the same as the direction of the light transmitted from the first light-transmitting part 131.

Naturally, by processing the exit surface 1322 of the second light-transmitting part 132, the refractive index of the exit surface 1322 of the second light-transmitting part 132 may be reduced, so as to enable the exit surface of the second light-transmitting part 132 to form the optical part 134 for enabling the refractive index of the exit surface 1322 of the second light-transmitting part 132 to be smaller than that of the second light-transmitting part 132. At this moment, the optical part 134 formed by the exit surface 1322 of the second light-transmitting part 132 enables the direction of the light transmitted from the second light-transmitting part 132 to be the same as the direction of the light transmitted from the first light-transmitting part 131.

Furthermore, in the situation where the exit surface 1322 of the second light-transmitting part 132 is an inclined surface, the incidence surface 1321 of the second light-transmitting part 132 and the exit surface 1322 of the second light-transmitting part 132 form an acute angle, and the optical part 134 is directly formed by the exit surface 1322 of the second light-transmitting part 132. At this moment, the second light-transmitting part 132 is optically denser medium relative to the outside air, and the refractive index of the second light-transmitting part 132 is greater than that of the outside air. Thus, the exit surface 1322 of the second light-transmitting part 132 may also refract the light transmitted through the second light-transmitting part 132 to be away from the normal, such that the direction of the light transmitted from the second light-transmitting part 132 is enabled to be the same as the direction of the light transmitted from the first light-transmitting part 131.

In the situation where the exit surface 1322 of the second light-transmitting part 132 is an inclined surface, a transition surface 134 is disposed between the exit surface 1322 of the second light-transmitting part 132 and the exit surface 1312 of the first light-transmitting part 131, and the transition surface 134 is arc-shaped.

In the case that the transition surface 134 is arc-shaped, the optical path at the intersection of the frame area 15 and the display area 14 is changed due to the optically divergent enlargement of the arc-shaped lens, such that viewers may not see the black border in the frame area 15 when viewing the frame area 15 through the transition surface 134.

As shown in FIG. 6, a method for manufacturing a display device is provided by an implementation of the present disclosure, and comprises the following steps.

Step S101: a display panel, a housing and a light-transmitting cover plate are provided, and the display panel is disposed in the housing to form a display area constituted by the display panel and a frame area surrounding the display area, wherein the light-transmitting cover plate has a first light-transmitting part and a second light-transmitting part.

The display panel is disposed in the housing, and comprises an upper polarizer, a color filter, a liquid crystal panel, a lower polarizer and a backlight source.

In this implementation, the upper polarizer, the color filter, the liquid crystal panel, the lower polarizer and the backlight source are arranged in sequence from top to bottom. The light emitted by the backlight source transmits outward through the lower polarizer, the liquid crystal panel, the color filter and the polarizer in sequence.

In this implementation, in order to increase the stability of the display device, the housing is of metal material.

Between both sides of the display panel and the housing is a gap for receiving wires from the display panel.

Step S102: the light-transmitting cover plate is disposed to cover the housing to form the outer surface of the display device, and the first light-transmitting part is enabled to correspond to the display area and the second light-transmitting part is enabled to correspond to the frame area.

In this implementation, the method further comprises bonding the light-transmitting cover plate to the housing, and bonding the display panel 11 to the light-transmitting cover plate, such that the display panel is secured in the housing.

The light-transmitting cover plate is secured to the upper surface of the housing by means of bonding.

The display panel is bonded to the lower surface of the light-transmitting cover plate, such that the display panel is disposed in the housing.

The light-transmitting cover plate has the first light-transmitting part corresponding to the display area and the second light-transmitting part corresponding to the frame area.

In this implementation, the first light-transmitting part has an area equal to the display area, and the second light-transmitting part has an area equal to the frame area.

The light emitted by the display panel transmits into the first light-transmitting part, and transmits toward viewers through the first light-transmitting part.

In this implementation, the incidence surface of the first light-transmitting part and the exit surface of the first light-transmitting part are both horizontal surfaces.

Step S103: the outer surface of the second light transmitting part is provided with an optical part used to change the exit direction of the light emitted by the display panel through the second light-transmitting part so as to enable the direction of the light transmitted from the second light-transmitting part to be the same as the direction of the light transmitted from the first light-transmitting part.

In an implementation of the present disclosure, the optical part enables the direction of the light transmitted from the second light-transmitting part to be the same or substantially the same as the direction of the light transmitted from the first light-transmitting part.

The optical part is provided on the exit surface of the second light transmitting part. The light emitted by the display panel transmits into the second light-transmitting part, and transmits outward through the exit surface of the second light-transmitting part. Since the exit surface of the second light-transmitting part is provided with the optical part used to change the exit direction of the light emitted by the display panel through the second light-transmitting part so as to enable the direction of the light transmitted from the second light-transmitting part to be the same as the direction of the light transmitted from the first light-transmitting part.

Because of the refraction effect of the optical part, when viewing the frame area through the optical part, viewers may see images formed by the light transmitted from the display panel through the frame area instead of a black border in the frame area, such that borderless display is achieved on the display device.

In the present disclosure, the incidence surface of the second light-transmitting part and the exit surface of the second light-transmitting part are mainly in the following two situations.

In the first situation, the method comprises configuring the incidence surface of the second light-transmitting part and the exit surface of the second light-transmitting part to be horizontal surfaces, and bonding an optical film to the exit surface of the second light-transmitting part to form the optical part, wherein the refractive index of the optical film is greater than that of the second light-transmitting part.

In order to enable the direction of the light transmitted from the second light-transmitting part to be the same as the direction of the light transmitted from the first light-transmitting part, the exit surface of the second light-transmitting part is provided with the optical film for forming the optical part refracting the light transmitted through the second light-transmitting part to be substantially parallel with the normal.

In accordance with the principle of the light refraction, when light transmits from optically thinner medium into optically denser medium, the light will be refracted close to the normal, and the incidence angle is greater than the exit angle. The optically denser medium and the optically thinner medium are relative media, and medium with a larger refractive index is referred to as optically denser medium while medium with a smaller refractive index is referred to as optically thinner medium. Thus, only if the refractive index of the optical film is greater than that of the second light-transmitting part, the light transmitted through the second light-transmitting part may be refracted to be substantially parallel with the normal, such that the direction of the light transmitted from the second light-transmitting part is enabled to be the same as the direction of the light transmitted from the first light-transmitting part.

Naturally, by processing the exit surface of the second light-transmitting part, the refractive index of the exit surface of the second light-transmitting part may be increased, so as to enable the exit surface of the second light-transmitting part to form the optical part for enabling the refractive index of the exit surface of the second light-transmitting part to be greater than that of the second light-transmitting part. At this moment, the optical part formed by the exit surface of the second light-transmitting part enables the direction of the light transmitted from the second light-transmitting part to be the same as the direction of the light transmitted from the first light-transmitting part.

In the second situation, the method comprises configuring the incidence surface of the second light-transmitting part to be a horizontal surface while configuring the exit surface of the second light-transmitting part to be an inclined surface, and bonding an optical film to the exit surface of the second light-transmitting part to form the optical part, wherein the refractive index of the optical film is smaller than that of the second light-transmitting part.

In the situation where the exit surface of the second light-transmitting part is an inclined surface, the incidence surface of the second light-transmitting part and the exit surface of the second light-transmitting part form an acute angle.

Specifically, the acute angle is 45°.

In order to enable the direction of the light transmitted from the second light-transmitting part to be the same as the direction of the light transmitted from the first light-transmitting part, the optical part refracts the light transmitted through the second light-transmitting part to be away from the normal.

In accordance with the principle of the light refraction, when light transmits from optically denser medium into optically thinner medium, the light will be refracted away from the normal, and the incidence angle is smaller than the exit angle. The optically denser medium and the optically thinner medium are relative media, and medium with a larger refractive index is referred to as optically denser medium while and medium with a smaller refractive index is referred to as optically thinner medium. Thus, only if the refractive index of the optical film is smaller than that of the second light-transmitting part, the light transmitted through the second light-transmitting part may be refracted to be away from the normal, such that the direction of the light transmitted from the second light-transmitting part is enabled to be the same as the direction of the light transmitted from the first light-transmitting part.

Naturally, by processing the exit surface of the second light-transmitting part, the refractive index of the exit surface of the second light-transmitting part may be reduced, so as to enable the exit surface of the second light-transmitting part to form the optical part for enabling the refractive index of the exit surface of the second light-transmitting part to be smaller than that of the second light-transmitting part. At this moment, the optical part formed by the exit surface of the second light-transmitting part enables the direction of the light transmitted from the second light-transmitting part to be the same as the direction of the light transmitted from the first light-transmitting part.

Furthermore, in the situation where the exit surface of the second light-transmitting part is an inclined surface, the incidence surface of the second light-transmitting part and the exit surface of the second light-transmitting part form an acute angle, and the optical part is directly formed by the exit surface of the second light-transmitting part. At this moment, the second light-transmitting part is optically denser medium relative to the outside air, and the refractive index of the second light-transmitting part is greater than that of the outside air. Thus, the exit surface of the second light-transmitting part may also refract the light transmitted through the second light-transmitting part to be away from the normal, such that the direction of the light transmitted from the second light-transmitting part is enabled to be the same as the direction of the light transmitted from the first light-transmitting part.

In the situation where the exit surface of the second light-transmitting part is an inclined surface, the method comprises disposing a transition surface between the exit surface of the second light-transmitting part and the exit surface of the first light-transmitting part, wherein the transition surface is arc-shaped.

In the case that the transition surface is arc-shaped, the optical path at the intersection of the frame area and the display area is changed due to the optically divergent enlargement of the arc-shaped lens, such that viewers may not see the black border in the frame area when viewing the frame area through the transition surface.

Figure 7:
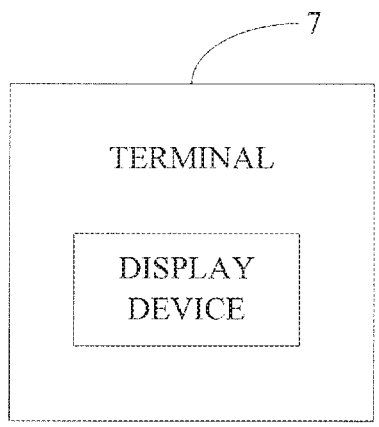
FIG. 7 is a schematic structural diagram of a terminal according to an implementation of the present disclosure.

Referring to FIG. 7 which is a schematic structural diagram of a terminal according to an implementation of the present disclosure, the terminal 7 comprises a display device, as shown in FIG. 7. The display device comprises a housing, a light-transmitting cover plate and a display panel disposed in the housing to form a display area constituted by the display panel and a frame area surrounding the display panel; the light-transmitting cover plate covers the housing to form the outer surface of the display device; the light-transmitting cover plate has a first light-transmitting part corresponding to the display area and a second light-transmitting part corresponding to the frame area; the light emitted by the display panel transmits outward through the first light-transmitting part and the second light-transmitting part; the outer surface of the second light-transmitting part is provided with an optical part used to change the exit direction of the light emitted by the display panel through the second light-transmitting part so as to enable the direction of the light transmitted from the second light-transmitting part to be the same as the direction of the light transmitted from the first light-transmitting part.

The cross-sectional view of the display device is as shown in FIG. 2, and the display panel is as shown in FIG. 3.

Furthermore, the second light-transmitting part has an incidence surface and an exit surface; the incidence surface of the second light-transmitting part and the exit surface of the second light-transmitting part are horizontal surfaces; the exit surface of the second light-transmitting part is provided with an optical film for forming the optical part; the refractive index of the optical film is greater than that of the second light-transmitting part.

Furthermore, the second light-transmitting part has an incidence surface and an exit surface; the incidence surface of the second light-transmitting part is a horizontal surface while the exit surface of the second light-transmitting part is an inclined surface; the exit surface of the second light-transmitting part is provided with an optical film for forming the optical part; the refractive index of the optical film is smaller than that of the second light-transmitting part.

Furthermore, a transition surface is disposed between the exit surface of the second light-transmitting part and the exit surface of the first light-transmitting part, and the transition surface is arc-shaped.

Furthermore, the light-transmitting cover plate is bonded to the housing, and the light-transmitting cover plate is bonded to the display panel such that the display panel is disposed in the housing.

The foregoing is merely the preferable implementations of the present disclosure, and is not intended to limit the present disclosure. Any amendments, equivalents, or improvements and so on within the spirit and principle of the present disclosure should be included within the protection scope of the present disclosure.

What is claimed is:

1. A display device comprising:
   a housing;
   a display panel disposed in the housing such that a gap is formed between sides of the display panel and sides of the housing;
   a light-transmitting cover plate covering the display panel and the gap to form an outer surface of the display device,
   wherein the light-transmitting cover plate has a first light-transmitting part corresponding to a display area of the display panel and a second light-transmitting part corresponding only to a non-luminous area that is a frame area surrounding the display area and the gap; and
   an optical part disposed on the outer surface of the second light-transmitting part,
      wherein the optical part and the outer surface are planar,
   wherein light emitted by the display panel transmits, through the first light-transmitting part, outward and toward a viewer of the display device;
   wherein the light emitted by the display panel transmits, through the outer surface of the second light-transmitting part, outward and away from the viewer of the display device;
   wherein the optical part is used to change a first direction of light exiting from the outer surface of the second light-transmitting part to be substantially the same as a second direction of light exiting from the first light-transmitting part, toward the viewer of the device;
   wherein the exit surface of the second light-transmitting part is parallel to an incidence surface of the second light-transmitting part; and
   wherein a first refractive index of the optical part of the second light-transmitting part is greater than a second refractive index of the second light-transmitting part.

2. The display device of claim 1, wherein the incidence surface of the second light-transmitting part and the exit surface of the second light-transmitting part are horizontal surfaces; and the exit surface of the second light-transmitting part is provided with an optical film for forming the optical part.

3. The display device of claim 2, wherein the light-transmitting cover plate is bonded to the housing, and the light-transmitting cover plate is bonded to the display panel such that the display panel is disposed in the housing.

4. The display device of claim 1, wherein the light-transmitting cover plate is bonded to the housing, and the light-transmitting cover plate is bonded to the display panel such that the display panel is disposed in the housing.

5. A method for manufacturing a display device, comprising:
   providing a display panel, a housing, and a light-transmitting cover plate, and disposing the display panel in the housing to form a display area constituted by the display panel and a frame area surrounding the display area, wherein the light-transmitting cover plate has a first light-transmitting part and a second light-transmitting part;
   disposing the light-transmitting cover plate to cover the display panel to form an outer surface of the display device, and enabling the first light-transmitting part to correspond to the display area and enabling the second light-transmitting part to correspond only to a non-luminous area that includes the frame area,
   wherein light emitted by the display panel transmits, through the outer surface of the second light-transmitting part, outward and away from a viewer of the display device; and
   providing the outer surface of the display device adjacent to the second light-transmitting part with an optical part used to change an exit direction of light emitted by the display panel through the second light-transmitting part so as to enable a first direction of light exiting from the second light-transmitting part to be substantially the same as a second direction of light exiting from the first light-transmitting part and toward the viewer of the device,
   wherein the optical part is planar,
   wherein the optical part is parallel to an incidence surface of the second light-transmitting part, and
   wherein a first refractive index of the optical part is greater than a second refractive index of the second light-transmitting part.

6. The method of claim 5, further comprising:
   configuring the incidence surface of the second light-transmitting part and the outer surface of the display device adjacent to the second light-transmitting part to be horizontal surfaces; and
   bonding an optical film to an exit surface of the second light-transmitting part to form the optical part.

7. The method of claim 6, further comprising:
   bonding the light-transmitting cover plate to the housing; and
   bonding the display panel to the light-transmitting cover plate such that the display panel is secured in the housing.

8. The method of claim 5, further comprising:
bonding the light-transmitting cover plate to the housing; and
bonding the display panel to the light-transmitting cover plate such that the display panel is secured in the housing.

9. A terminal comprising:
a display device that comprises:
    a housing,
    a light-transmitting cover plate,
    a display panel disposed in the housing to form a display area constituted by the display panel and a frame area surrounding the display panel,
        wherein the light-transmitting cover plate covers the display panel to form an outer surface of the display device;
        wherein the light-transmitting cover plate has a first light-transmitting part corresponding to the display area and a second light-transmitting part corresponding only to a non-luminous area that includes the frame area;
        wherein light emitted by the display panel transmits outward and toward a viewer through the first light-transmitting part and outward and away from the viewer through the second light-transmitting part; and
    an optical part provided on the outer surface of the display device adjacent to the second light-transmitting part,
        wherein the optical part is used to change an exit direction of light emitted by the display panel through the second light-transmitting part so as to enable a first direction of light exiting from the second light-transmitting part to be substantially the same as a second direction of light exiting from the first light-transmitting part and toward the viewer,
        wherein the outer surface is parallel to an incidence surface of the second light-transmitting part, and
        wherein a first refractive index of the optical part is greater than a second refractive index of the second light-transmitting part.

10. The terminal of claim 9, wherein the incidence surface of the second light-transmitting part and an exit surface of the second light-transmitting part are horizontal surfaces; and the exit surface of the second light-transmitting part is provided with an optical film to form the optical part.

11. The terminal of claim 9, wherein the light-transmitting cover plate is bonded to the housing, and the light-transmitting cover plate is bonded to the display panel such that the display panel is disposed in the housing.

* * * * *